Dec. 2, 1947.  W. R. ROYER  2,431,709
TIRE CHAIN
Filed March 8, 1944  3 Sheets-Sheet 1
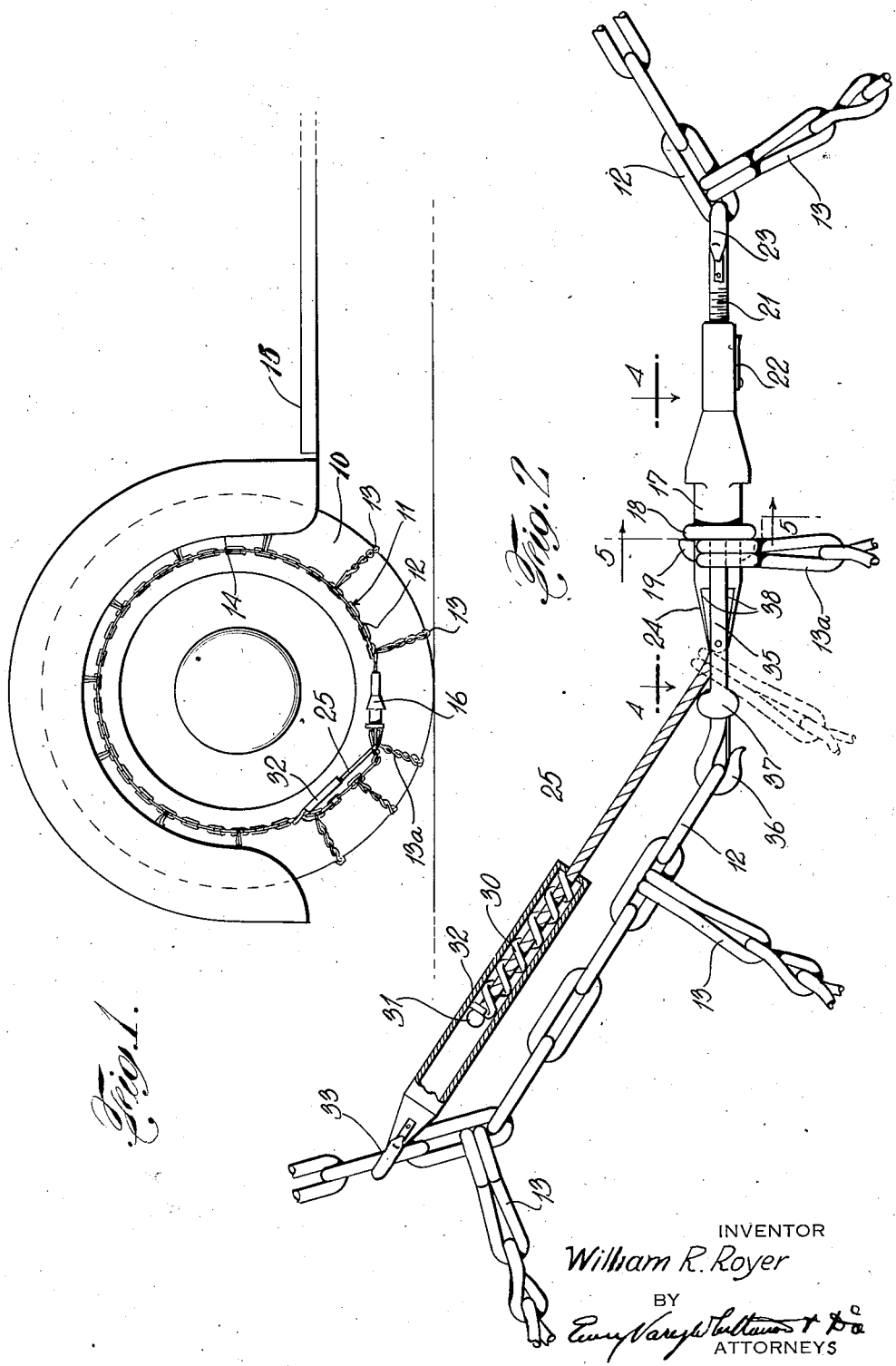
INVENTOR
William R. Royer
BY
ATTORNEYS Dec. 2, 1947. W. R. ROYER 2,431,709
TIRE CHAIN
Filed March 8, 1944 3 Sheets-Sheet 2
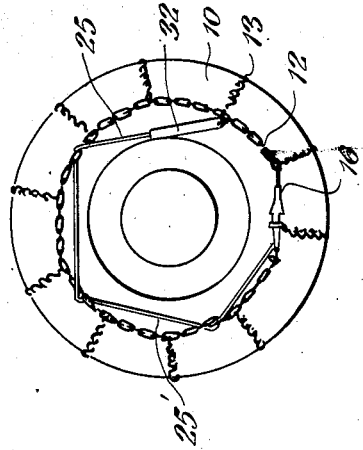
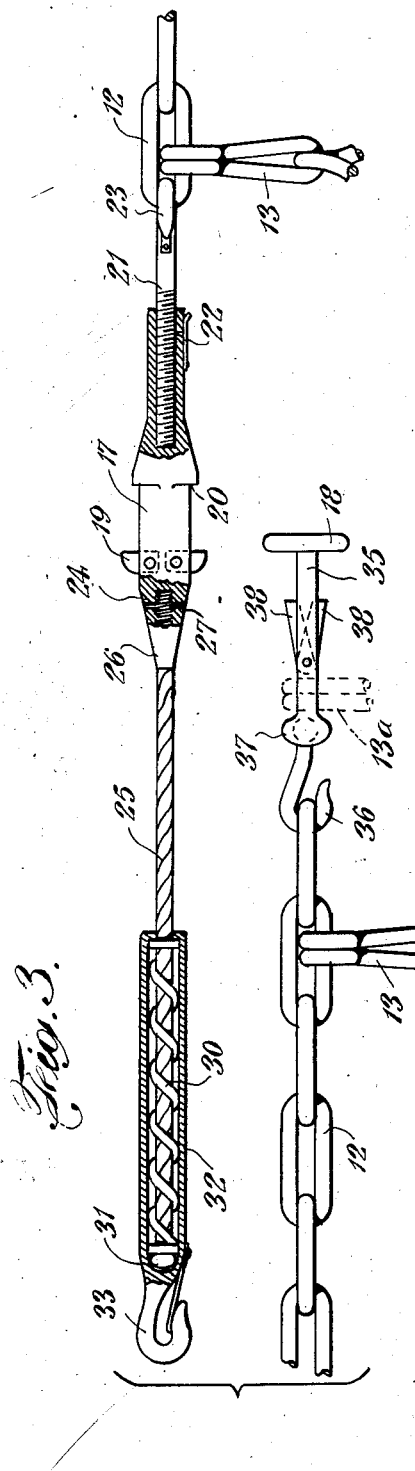
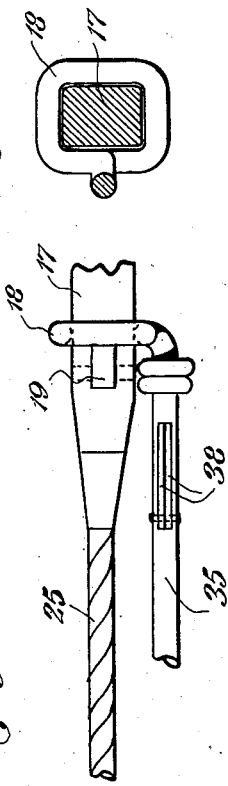
INVENTOR
William R. Royer
BY
ATTORNEYS

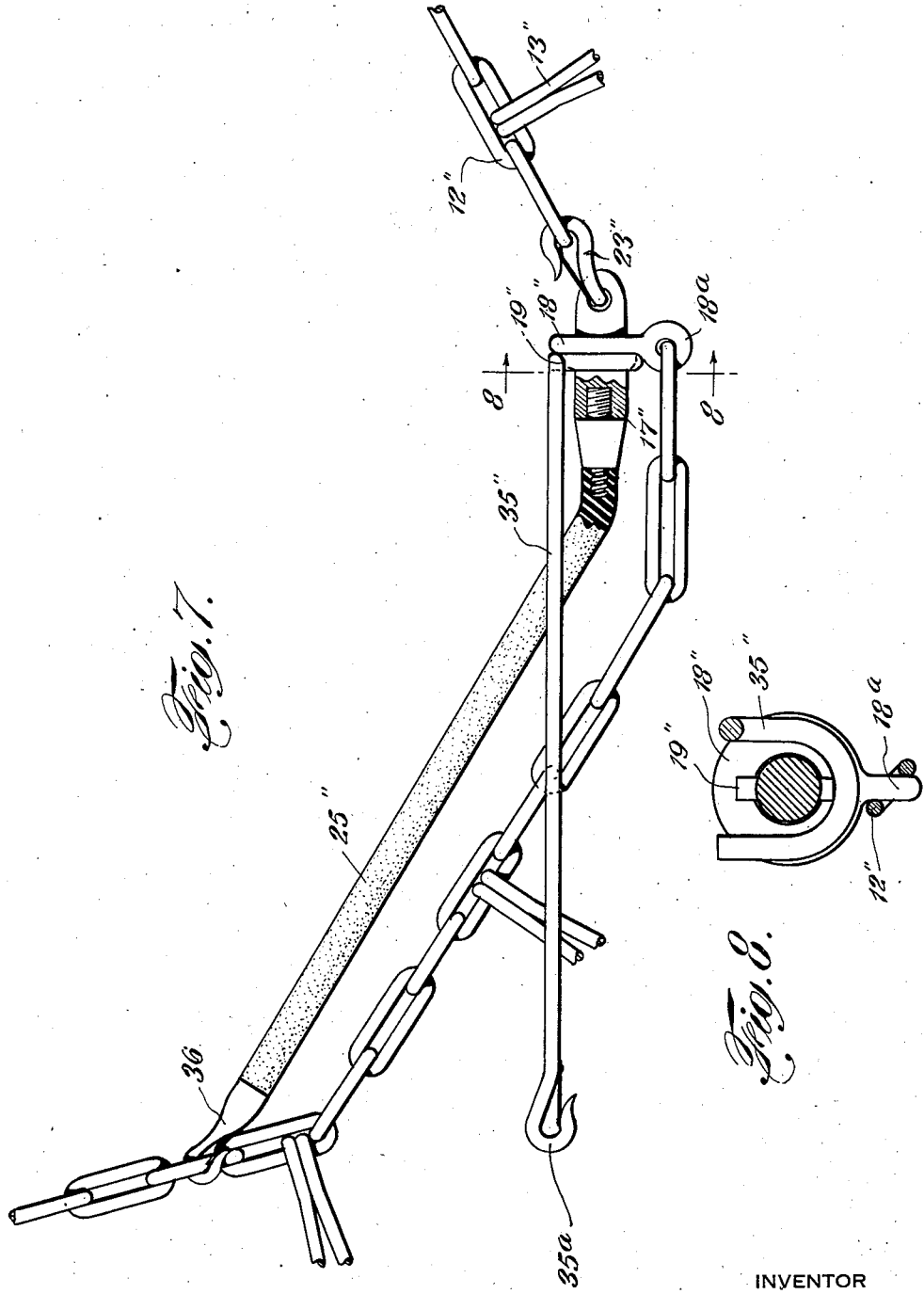

Patented Dec. 2, 1947

2,431,709

UNITED STATES PATENT OFFICE 2,431,709

TIRE CHAIN

William R. Royer, Wilkes-Barre, Pa.

Application March 8, 1944, Serial No. 525,491

8 Claims. (Cl. 152—241)

This invention relates to tire chains and connectors and has for an object the provision of improvements in this art.

This application is a continuation-in-part of my copending application, Serial Number 428,811, filed January 30, 1942, now Patent No. 2,363,998, granted November 28, 1944.

One of the particular objects of the invention is to provide an improved tire chain connector with a flexible pilot element for telescopic coupling elements, the flexible pilot member being resilient, detachable if desired, and being provided with attaching means at its leading end for securely connecting it into the chain assembly if it is desired to leave it on the wheel as a tension anti-slip element.

Another object is to provide improved means for mounting a cross chain on the coupling means.

Another object is to provide rigid means for pushing the female coupling member while pulling the male coupling member to which the flexible pilot element is connected.

Another object is to provide means for placing a joint cross chain in medial position without raising the tire from the ground.

The above and other objects and advantages of the invention will be apparent from the following description of an exemplary embodiment thereof, reference being made to the accompanying drawings wherein:

Fig. 1 is a side elevation of a rear wheel and tire of a passenger automobile equipped with a chain and connections according to the present invention;

Fig. 2 is an enlarged view of the parts shown in the connection region of Fig. 1;

Fig. 3 is a view of the parts separated from each other and laterally displaced but in their proper relative longitudinal positions;

Fig. 4 is a top plan view of the coupling members shown in Fig. 3 in assembled relation;

Fig. 5 is a transverse section taken on the line 5—5 of Fig. 2;

Fig. 6 is a side elevation of a tire chain equipped with a longer stretcher member;

Fig. 7 is a modification employing elastic material for the flexible resilient member, a simplified connector, and a removable pusher member in the nature of an accessory tool; and Fig. 8 is a transverse section taken on the line 8—8 of Fig. 7.

The wheel 10 of Fig. 1 is shown to be equipped with a chain 11 comprising side chains 12 and cross chains 13. The fender 14 and running board 15 are shown for purposes of orientation. Each side chain at the gap is provided with a coupling device generally denoted by the numeral 16.

The coupling device 16 comprises telescopic coupling members 17, 18, male and female respectively, which are adapted to be push-pulled together and secured in fastened position by spring latch means 19. A raised shoulder 20 is provided on the male member 17 at a distance behind the latches 19 to limit the telescopic movement of the female member 18. The male member is connected to a side chain link either permanently or detachably, the latter preferably where the connector is sold for use with different chains; the former more frequently when the chains are provided with the coupling devices as original equipment. Herein a removable adjustable attachment is shown, this comprising the splined, here a longitudinally slotted rod 21 threaded into the end of the male member, a spring latch 22 holding the rod in adjusted position; and a safety hook 23 on the end of the rod being provided to attach it to the chain link.

At its other end the male member 17 is tapered, as at 24, for easy threading and at the end of the tapered portion is provided with a long flexible pilot threading member 25 which is long enough to reach across the restricted space behind the tire for making the connection of a side chain. As an indication, it will be as long as the distance between about two cross chains. The male member and its flexible end member will be long enough to be passed behind the tire from one hand to another by reaching across the tire with the wrists in the angles between tire and ground but without reaching behind the tire with the forearm. The flexible part is thrown around behind the tire with a wrist motion. The other hand can then reach the end of the flexible member without reaching behind the tire with the forearm. The long rigid portion of the male member gives the hand a good grasp for throwing the flexible end portion around. The rigid part of the male member, for a general idea, may be as long as one or two spaces between cross chains, depending upon its longitudinal adjustment.

The flexible member 25 may be permanently or removably attached to the rigid part of the male member 17, here shown as threaded by a tapered plug 26 into the end of the rigid part to be removable but being made permanent by screwing in very tightly or by using solder or a drive pin 27, or both.

The flexible member 25 may be merely flexible or flexible and also resilient, the latter being shown in Fig. 2 where a spring 30 is secured between the enlarged end 31 of the flexible member and a retaining tubular spring housing 32.

When the flexible member is intended to be left on the wheel with the chain, as preferred, it is further provided with a safety hook 33 for attachment in one of the side chain links.

The female member 18 is provided with a long rigid shank 35 connectible to the link of the side chain 12, as by a safety hook 36, and having a swivel joint 37. The rigid female member is long enough to grasp and hold firmly and push the ring or eye along the male member until the coupling connection is made.

As an added feature, to prevent having too long an ungripped tire portion at the joint, the female member (or members, front and rear) may be provided with a supplemental cross chain 13a. This cross chain preferably has longitudinal shifting movement of a considerable distance along the shank 35, say several inches, between the swivel joint 37 and the eye or loop. Before and during connection this supplemental cross chain will lie alongside the swivel joint to leave an extensive length of tire free to rest on the ground and permit application of the chains without jacking up the wheel; but when the car is started the wheel and side chains will creep backward relative to the supplemental cross chain to the effect of moving the cross chain forward toward the eye or ring. In so moving forward the links of the cross chain will pass over the shouldered springs 38 and thereafter be held in forward position.

In Fig. 6 there is shown a modification, which may comprise all of the described features of the form shown in Figs. 1 to 5, and have in addition a flexible element 25' of greater length so that it can be looped around the side chain between cross chains in several places and extend almost around the entire side chain as a tension element. Preferably, the long extension is provided only on the outside side chain, a short extension being used on the inside because of the relative inaccessibility there.

The form shown in Figs. 7 and 8 is similar in principle to the previous form but has shorter male and female members and employs a removable rigid pusher device in the nature of an accessory tool.

Here the side chains 12" having cross chains 13" are provided with male members 17" having hooks 23", spring latches 19", and a detachable flexible pilot or guide element 25" with a hook 36". In this case the flexible element is extensible throughout most of its length instead of in a limited portion, as with the spring, being made of some resilient material like rubber.

The female member is here formed with an eye 18a adapted to be secured to one end of the side chain. The ring is moved into connected position on the male member past the latches by pulling on the flexible element and pushing with the long rigid rod 35". The rod is provided with a safety hook 35a by which it can be attached to the assembly to prevent loss when the chains are put away after use.

In operation the chain is draped over the top of the tire in equalized position. The tire need not be raised from the ground. Then the flexible member 25 is thrown around behind the tire from the forward side. It can then be easily reached from the rearward side and threaded through the female member 18. The cross chain 13a will be in its rearward position because it is held back by the bottom of the tire resting on the ground. The coupling parts are telescoped into connecting position by a push-pull action, the flexible extension of the male member being pulled and the long rigid female member (the tool 35" of Figs. 7 and 8) being pushed. After latching occurs the flexible member is stretched and its end hook caught in a side chain link. It then serves as a stretcher element for the side chain.

While certain embodiments of the invention have been described by way of example, it is to be understood that there may be various embodiments within the limits of the prior art and the scope of the subjoined claims.

I claim:

1. In a tire chain assembly comprising in combination with the usual cross and side chains, a connector adapted to bring the spaced ends of a tire chain together and couple them, said connector including two mating coupling members slidable longitudinally along each other to make connection in drawn up position, means connecting said members to opposite ends of a tire side chain respectively, and a flexible extension having one end secured to one of the coupling members, passing through the other coupling member, and passing beyond and being finally secured to the side chain beyond the second coupling member.

2. In a tire chain assembly comprising in combination with the usual cross and side chains, a tire chain connector adapted to bring the ends of a side chain together and couple them, said connector including a male coupling member attached to a first end of a side chain and having a latch along its length, a female coupling member attached to the second end of the side chain and adapted to be threaded along the male member and caught by the latch thereof, and a flexible extension on the end of the male member threaded through the female member and passing beyond the female member and finally being secured to the side chain beyond the female coupling member.

3. In a tire chain assembly comprising in combination with the usual cross and side chains, a tire chain connector adapted to bring the ends of a side chain together and couple them, said connector including a male coupling member attached to a first end of a side chain and having a latch along its length, a female coupling member attached to the second end of the side chain and adapted to be threaded along the male member and caught by the latch thereof, and a flexible extension on the end of the male member threaded through the female member and passing beyond the female member and finally being secured to the side chain beyond the female coupling member, said flexible extension being resilient and pulled out in tension in its connection with the side chain.

4. In a tire chain assembly comprising in combination with the usual cross and side chains, a tire chain connector adapted to bring the ends of a side chain together and couple them, said connector including a male coupling member attached to a first end of a side chain and having a latch along its length, a female coupling member attached to the second end of the side chain and adapted to be threaded along the male member and caught by the latch thereof, and a flexible extension on the end of the male member threaded through the female member and passing beyond the female member and finally being secured to the side chain beyond the female coupling member, said flexible extension including a spring and being pulled out in tension in its connection with the side chain.

5. In a tire chain assembly comprising in combination with the usual cross and side chains, a tire chain connector adapted to bring the ends of a side chain together and couple them, said connector including a male coupling member attached to a first end of a side chain and having a latch along its length, a female coupling member attached to the second end of the side chain and adapted to be threaded along the male member and caught by the latch thereof, and a flexible extension on the end of the male member threaded through the female member and passing beyond the female member and finally being secured to the side chain beyond the female coupling member, said flexible extension including a rubber portion and being pulled out in tension in its connection with the side chain.

6. In a tire chain assembly comprising in combination with the usual cross and side chains, a tire chain connector adapted to bring the ends of a side chain together and couple them, said connector including a male coupling member attached to a first end of a side chain and having a latch along its length, a female coupling member attached to the second end of the side chain and adapted to be threaded along the male member and caught by the latch thereof, and a flexible extension on the end of the male member threaded through the female member and passing beyond the female member and finally being secured to the side chain beyond the female coupling member, said flexible extension being looped in the side chain at a plurality of spaced points after passing the female coupling member and then secured to the side chain.

7. In a tire chain assembly comprising in combination with the usual cross and side chains, a tire chain connector adapted to bring the ends of a side chain together and couple them, said connector including a male coupling member attached to a first end of a side chain and having a latch along its length, a female coupling member attached to the second end of the side chain and adapted to be threaded along the male member and caught by the latch thereof, and a flexible extension on the end of the male member threaded through the female member and passing beyond the female member and finally being secured to the side chain beyond the female coupling member, said flexible extension having a resilient portion near its end and being looped in the side chain at a plurality of spaced points after passing the female coupling member and then secured to the side chain in tension.

8. A tire chain assembly comprising two side chains with connectible ends and a plurality of connecting cross chains, each side chain including telescopic coupling members secured to the respective ends, one of said coupling members including a flexible resilient extension passing through the other and secured in tension to a side chain therebeyond, both side chains thus being placed in tension by the coupling extensions.

WILLIAM R. ROYER.

REFERENCES CITED

The following references are of record in the file of this patent:

UNITED STATES PATENTS

| Number | Name | Date |
| --- | --- | --- |
| 1,258,823 | Smith | Mar. 12, 1918 |
| 1,267,925 | Smith | May 28, 1918 |
| 1,618,941 | Meade | Feb. 22, 1927 |
| 1,599,050 | Halfenstein | Sept. 7, 1926 |
| 2,074,616 | Martel | Mar. 23, 1937 |